(No Model.)
J. MOHN.
TAP AND BUSHING.
No. 542,063. Patented July 2, 1895.
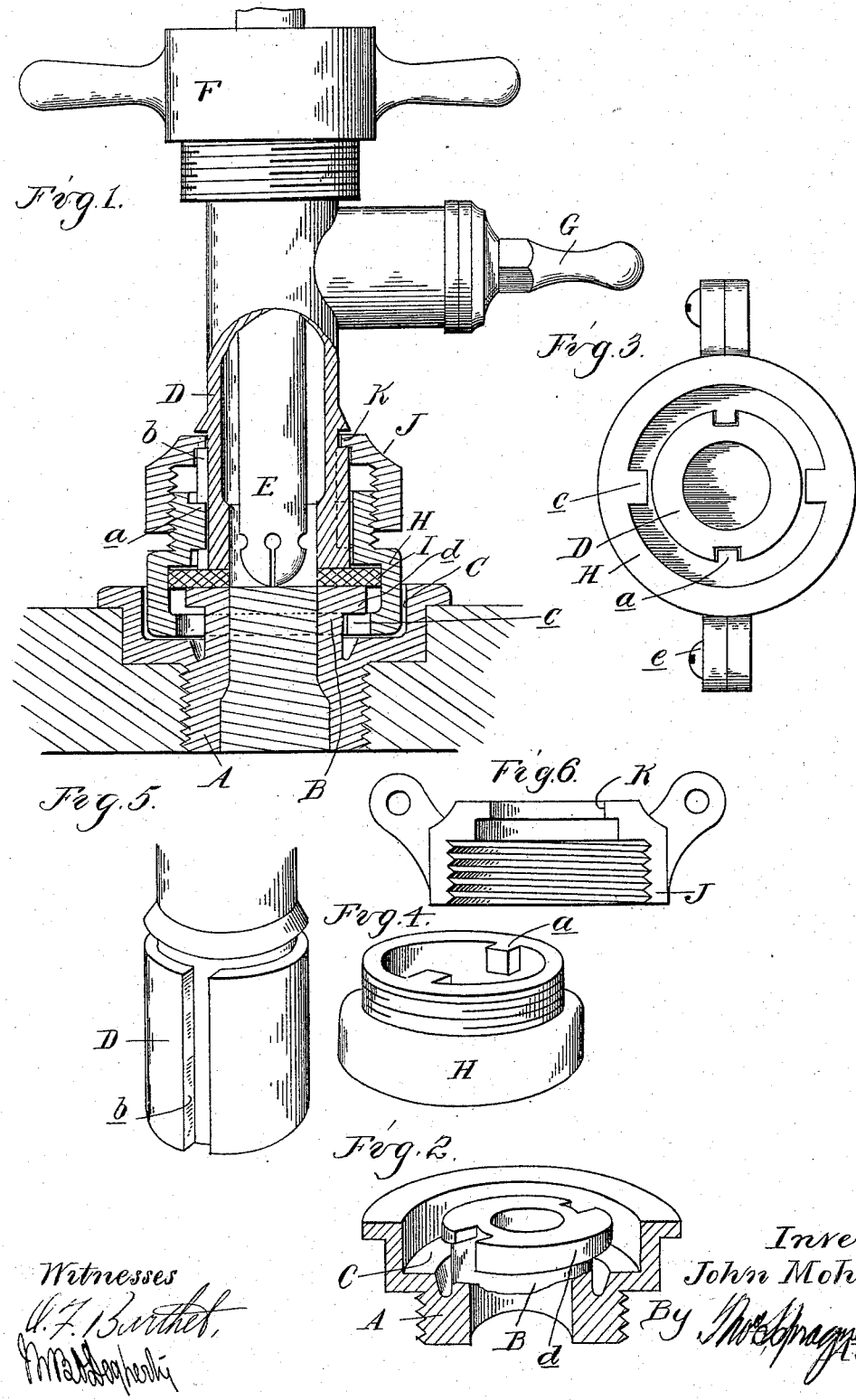
Witnesses
Inventor
John Mohn ated relation upon the inner end of the sleeve, substantially as described.

UNITED STATES PATENT OFFICE.

JOHN MOHN, OF DETROIT, MICHIGAN.

TAP AND BUSHING.

SPECIFICATION forming part of Letters Patent No. 542,063, dated July 2, 1895.

Application filed April 11, 1895. Serial No. 545,325. (No model.)

*To all whom it may concern:*

Be it known that I, JOHN MOHN, a citizen of the United States, residing at Detroit, in the county of Wayne and State of Michigan, have invented certain new and useful Improvements in Taps and Bushings, of which the following is a specification, reference being had therein to the accompanying drawings.

This invention relates more particularly to certain improvements upon a similar device for which Letters Patent were granted to me December 11, 1894, No. 530,703; and the improvement consists especially in the improved construction of the tap, whereby the coupling member of the tap is secured in adjustable relation with the seat of the tap, all as more fully hereinafter described and shown in the drawings, in which—

Figure 1 is a vertical central section through my improved tap, showing it as being coupled to the bushing. Fig. 2 is a sectional perspective view of the bushing. Fig. 3 is an end view of the tap. Fig. 4 is a detached perspective view of the coupling member of the tap. Fig. 5 is a perspective view of the inner end of the sleeve of the tap, and Fig. 6 is a section of the screw-nut by which the coupling member is held in adjustable relation with the tap.

A is the screw-bushing provided with a flanged nipple B, contained within a recess C of the bushing and forming the seat and coupling member of the bushing, all as described in my former patent.

The tap consists of an outer cylindrical sleeve D and a tap-tube E, slidingly secured within the outer sleeve by means of a suitable stuffing-box F, formed at the outer end of the sleeve D. The sleeve D is provided with the usual branch coupling G for securing a pipe or hose for admitting air under pressure, as in the usual manner.

The inner end of the sleeve of the tap is provided with a loose collar or extension H, which is held in sliding engagement upon the sleeve by means of projections $a$, engaging into corresponding grooves $b$ in the sleeve. This collar or extension forms the coupling member of the tap, by means of which it is secured to the bushing, the drawings showing it to this end provided with the interior lugs $c$, adapted to engage with the interrupted screw-flanges $d$, around the nipple of the bushing, all in the well-known manner. Within a suitable interior recess of this collar or extension is secured a rubber gasket I, which, in connection with the inner end of the sleeve D, forms the seat of the tap. The collar H is held in adjustable relation upon the inner end of the sleeve by means of a hollow screw-nut J, loosely sleeved upon the sleeve D and held thereon against longitudinal displacement in any suitable manner, such as by means of an interior annular flange K, engaging into a corresponding groove in the sleeve D. If constructed in this manner, the screw-nut, for the purpose of engaging it on the sleeve D, is formed in halves secured together by means of rivets or screws $e$, passing through suitable lugs on the halves.

The parts being constructed and arranged as shown and described, it will be seen that the tap may be as readily secured to the bushing as in my former construction. At the same time it will be seen that the collar H can be made to project more or less beyond the inner end of the sleeve D by the adjustment provided by means of the nut J, which when revolved in one direction will project the collar H and when turned in the other direction will retract the collar. Thus, if the tap is engaged with a bung and it should be found that the seats on the bung and tap are not drawn firmly enough together to form a tight joint with the gasket, such tight joint may be formed by a suitable adjustment by means of the nut J.

With this improvement upon my former construction I provide for all variations which may occur in the manufacture of this device and for the wearing of the seats and gasket as occasioned by long use.

What I claim as my invention is—

1. The combination with a bushing forming one coupling member and provided with a seat within the bushing, of a tap, composed of an outer sleeve adapted to seat against the seat of the bushing and of a tap tube slidingly engaging within said sleeve, a loose collar or extension held in sliding engagement upon the inner end of said sleeve and forming the coupling member of the tap, and a screw nut holding said loose collar in adjustable relation with the exterior sleeve of the tap, substantially as described.

2. In a tap and bushing, the combination with the bushing provided with an annular recess, and a flanged nipple located within said recess and forming the seat and coupling member of the bushing, of a tap composed of the outer sleeve D and of a tap tube E slidingly passing through said sleeve, the sliding collar or extension H on the inner end of the sleeve D and forming the coupling member of the tap, the gasket I secured in a recess of said collar and forming in connection with the inner end of the sleeve D, the seat of the tap, and the adjustable screw nut J upon the sleeve D and provided with an interior flange K engaging in the annular groove of the sleeve D all arranged and combined to operate substantially as and for the purpose described.

In testimony whereof I affix my signature in presence of two witnesses.

JOHN MOHN.

Witnesses:
M. B. O'DOGHERTY,
O. F. BARTHEL.